United States Patent [19]

Bridwell

[11] 4,055,991
[45] Nov. 1, 1977

[54] LIQUID GAUGE ASSEMBLY

[75] Inventor: Willie Earl Bridwell, Tampa, Fla.

[73] Assignee: Kapsura, Inc., Tampa, Fla.

[21] Appl. No.: 704,487

[22] Filed: July 12, 1976

[51] Int. Cl.² ............................................. G01F 23/06
[52] U.S. Cl. .......................................... 73/73; 73/319
[58] Field of Search ................... 73/73, 319, 322, 444, 73/447, 448, 449, 335

[56] References Cited

U.S. PATENT DOCUMENTS

| 358,285 | 2/1887 | Maxey | 73/319 |
|---|---|---|---|
| 362,719 | 5/1887 | Campbell | 73/319 |
| 1,424,108 | 7/1922 | Luthy | 73/448 |
| 1,482,852 | 2/1924 | Kloepper | 73/322 |

*Primary Examiner*—Donald O. Woodiel
*Attorney, Agent, or Firm*—Duckworth, Hobby, Orman, Allen & Pettis

[57] ABSTRACT

A liquid gauge mechanism of the type primarily designed to be used in containers utilized for maintaining or growing plants therein wherein the casing of the gauge mechanism is at least partially submerged within the root system and surrounding liquid so as to indicate the level of liquid within the container. An indicator element is movably disposed within the hollow container of the gauge mechanism and has indicia formed thereon so as to be viewable through the casing of the indicator means. The level of liquid within the container is the same as the level of liquid within the casing. The indicator element being floatable within the casing serves to position the indicia thereon in aligned relation with a window or viewing portion through the casing so as to indicate the level of the liquid relative to the root system of the plant maintained within the container.

7 Claims, 6 Drawing Figures

U.S. Patent  Nov. 1, 1977  4,055,991
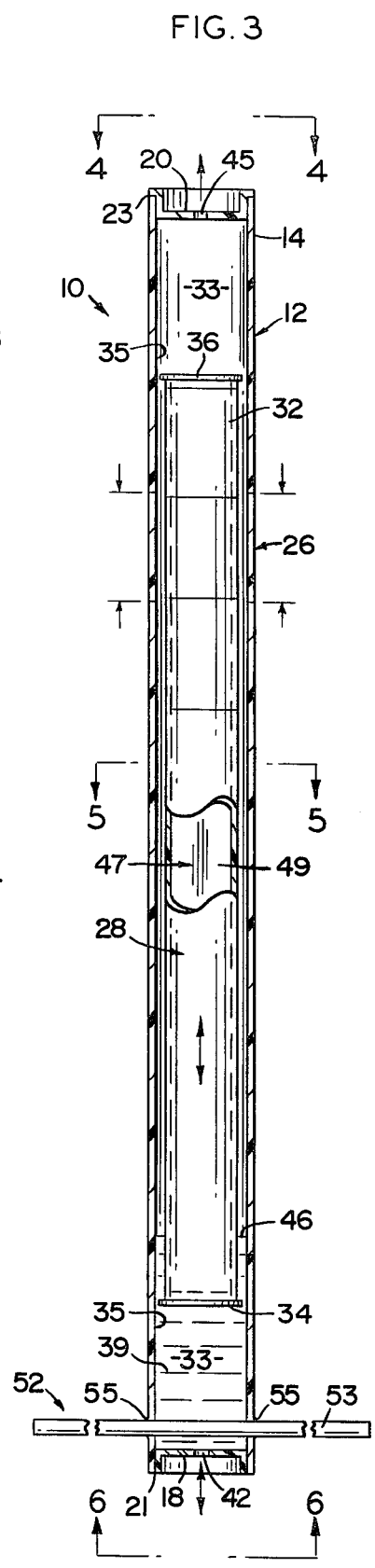
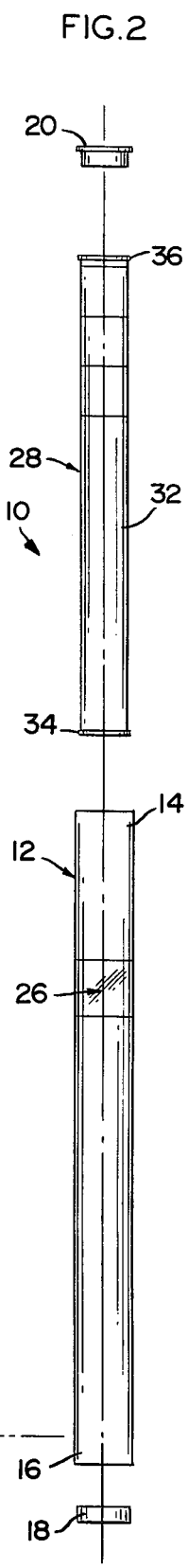
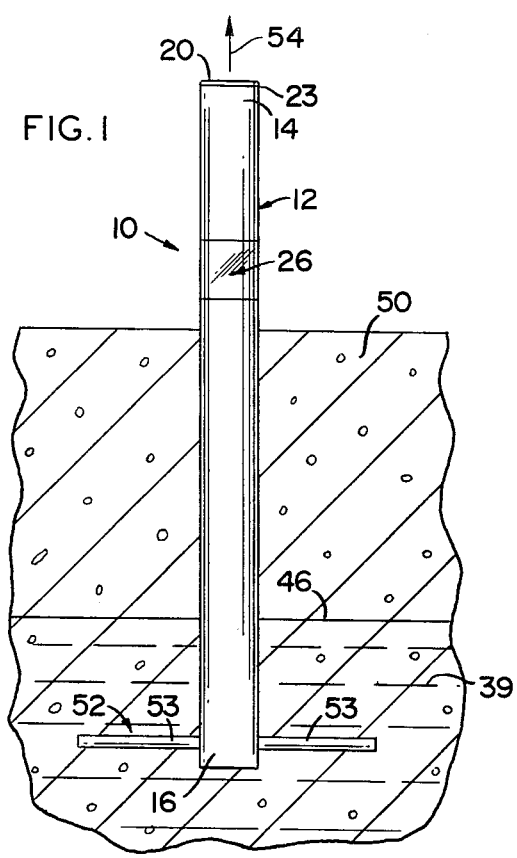
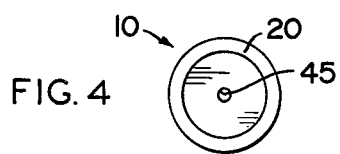
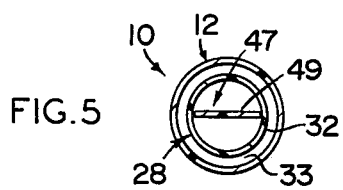
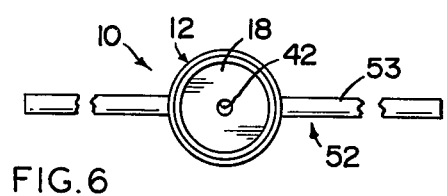
FIG. 1
FIG. 2
FIG. 3
FIG. 4
FIG. 5
FIG. 6

LIQUID GAUGE ASSEMBLY

BACKGROUND OF THE INVENTION

1. Field of the Invention

This invention relates to a liquid level gauge of the type to be used embedded in a substantially liquid foundation for a root system in a plant container so that the level of liquid within the container can be immediately determined and monitored over a relatively long period of time.

2. Description of the Prior Art

In the last few years there has developed a rapid growth in a specific area of the agricultural industry in the U.S. This particular area includes the hydroponic growing and maintenance of plants, flowers, and like agricultural products. Generally, the term "hydroponic" may be utilized as the term definition for the growing and maintenance of plants, etc., in a liquid rather than soil environment. More specifically, hydroponics deals with the growing and maintenance of various types of plants wherein the root system is not embedded in a soil in the conventional manner. Rather, the application of hydroponic agricultural growing comprises providing or adding proper plant nourishment to a water or other applicable liquid environment and maintaining the root system of the plant in a submerged or at least partially submerged condition relative to the enriched or fortified liquid.

In addition, a foundation is frequently provided in the form of gravel, stones, or a substantially clay like material of varied consistency for the purpose of providing proper support for the root system of the agricultural product being maintained.

Hydroponics is becoming increasingly popular for domestic application in the growing and maintenance of plants or like agricultrual products intended primarily for decorative use. Such popularity is generally attributed to the relatively carefree maintenance requirement to keep the plant properly nourished and healthy. The maintenance of decorative plants utilizing the conventional soil foundation for the root system normally requires daily or periodic watering, fertilizing and like maintenance functions. To the contrary, servicing of agricultural products being grown or maintained utilizing hydroponic methods require much less care and infrequent servicing.

Hydroponics has also become increasingly popular in the industrial growing of agricultural products generally concerned with the production of seedlings for large scale growing or the maintenance of food-bearing plants, etc.

While the basic method and process of hydroponic growing is well-known and recognized, there is an ever increasing need for additional facilities to aid in the efficiency, effectiveness or convenience of such growing techniques. More specifically, in the maintenance of the plants or agricultural products growing in a hydroponic environment a critical factor is the provision of maintaining the root system of the plants concerned in adequate amounts of liquid. Since such plants are exposed to the environment, either indoors or outdoors, evaporation of this liquid takes place at varying rates depending upon the conditions of the ambient temperature, humidity, etc.

Accordingly, there is a need in the industry for a container specifically structured for use in combination with an adequate gauge mechanism which allows for efficient and effective monitoring of the amount of fluid within the container and the level of that fluid relative to the position or orientation of the root system of the plant. Such a container structure should be of relatively simple design and capable of production in various configurations so as to add the esthetic appearance of the plant itself while at the same time rendering the container economically desirable both from the standpoint of initial purchase over placement and upkeep.

SUMMARY OF THE INVENTION

This invention relates to a fluid gauge of the type primarily designed for placement, in a submerged or partially embedded disposition relative to the plant system maintained in a container or the like. More specifically, the liquid gauge of the present invention is primarily designed to be used with hydroponic growing systems wherein it is critical to insure a proper quantity or level of water within the container relative to the position of the root system of the plant being maintained or grown.

The liquid gauge comprises a casing having a substantially elongated configuration and a hollow interior extending along at least a major portion of its length. A vent means and an inlet means are formed directly in the casing in spaced relation to one another. Both the vent means and the inlet means comprise at least one aperture formed in the casing and thereby establishing fluid communication between the exterior and interior of the casing. In one embodiment of the present invention the vent means and the inlet means are located at opposite extremities of the casing wherein air escapes from the vent means aperture concurrently to liquid passing into the inlet means aperture.

The liquid gauge further comprises an indicator means also having a substantially elongated configuration but a longitudinal dimension somewhat less than that of the casing. The indicator means is movably mounted within the interior of the casing and structured so as to be floatable relative to any liquid being maintained within the casing. Therefore, the position of the indicator means within the casing is directly determined by the quantity or level of liquid within the casing. Since the level of liquid in the container and in the casing in which the container is disposed will be equalized, the position of the indicator means and the observance of this indicator means through predetermined portions of the casing will allow immediate determination or relatively long time monitoring of the level of liquid within the container.

The indicator means itself may comprise a solid piece of material being formed of a substance having a specific gravity less than water so as to maintain a floatable orientation on the interior of the casing. However, in the preferred embodiment the indicator means comprises a one piece tubular element being at least partially hollow on its interior and being completely closed or sealed off from the exterior so as to be segregated from fluid passing into the casing. Again, this will provide the buoyant characteristics of the indicator means needed for the desired operation of the liquid gauge structure.

Further structural features of the indicator means comprises the incorporation of spacer means mounted on the indicator means and extending substantially outward from the exterior surface thereof. This outward protrusion of the spacer means serves to engage the interior surface of the wall of the casing and prevent the major exterior surface area of the indicator means from engaging the interior surface of the wall of the casing. Elimination of the spacer means and thereby allowance of interengagement between the outer wall of the indicator means and the interior surface of the casing would cause a substantially "frictional" engagement which in some instances would prevent the buoyant characteristics of the indicator means or tubular element from allowing the indicator means to float in the liquid within the casing thereby indicating proper levels of liquid within the container and the casing.

In one embodiment of the present invention spacer means comprises at least two flanges arranged in spaced relation to one another along the length of the tubular element and having a substantially annular configuration so as to extend outwardly from the exterior surface of the indicator means and thereby be disposed in engageable relation with the interior wall surface of the casing.

Another structural feature of the present invention comprises the provision of an indicia means. In the preferred embodiment, the indicia means comprises an elongated strip disposed in cooperative engagement with the indicator means so as to be viewable through the casing or predetermined portions thereof. More particularly, considering the embodiment utilizing the hollow, tubular element, the indicator strip comprises an elongated strip mounted on the interior of the tubular element and having a plurality of markings thereon so as to indicate the relative position of the level of liquid within the container, and therefore within the casing, relative to the root system of the plant being maintained.

The casing itself comprises a window portion or other predetermined portion thereof specifically aligned with the intended or predetermined positioning of the indicator means for proper level control.

In one embodiment of the present invention, the casing may be entirely transparent and have certain indications or markings thereon so as to allow alignment with other predetermined markings positioned on the indicator means. Alternately, the casing may have a transparent "window" through which is viewable portions of the markings indicating the relative level of the liquid in the container to the root system of the plant being maintained therein.

Yet another embodiment of the present invention is the provision of an anchor means. The anchor means, is connected to the casing and extends outwardly therefrom into securing engagement with the surrounding foundation (soil, clay rock, etc.) which provides foundation to the plant being maintained in the container. The anchor means comprises an elongated rod connected to the casing and extending outwardly therefrom on both sides thereof in substantially transverse relation to the longitudinal axis of the casing. Preferably, this anchor rod may be removably attached for easy removal from the casing making the entire gauge more practical for shipping and/or storing. However, placement of the anchor rod in its transverse relation prior to submerging the gauge within the container will insure its inadvertent removal from the plant foundation during operation. This may frequently occur if children or the like notice the attractive colorings of any specified indicia contained thereon or otherwise become curious.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a sectional view in partial cutaway showing placement of the gauge assembly of the present invention in a combined fluid and/or soil substance.

FIG. 2 is an exploded view of the structural details of the gauge assembly of the present invention.

FIG. 3 is a longitudinal sectional view showing the relative structural features of the present invention and the interior thereof.

FIG. 4 is an end view taken along line 4—4 of FIG. 3.

FIG. 5 is a sectional view taken along line 5—5 of FIG. 3.

FIG. 6 is an end view taken along line 6—6 of FIG. 3.

Similar reference characters refer to similar parts throughout the several views of the drawings.

DETAILED DESCRIPTION

As best shown in FIGS. 1, 2 and 3, the gauge assembly of the present invention is generally indicated as 10 and comprises a casing means 12 having a substantially hollow, open interior and defined by a substantially elongated configuration. In this particular embodiment the casing means 12 has a cylindrical configuration and may be "closed off" or have its opposite ends 14 and 16 segregated from the surrounding atmosphere by cap members 18 and 20, respectively. These cap members 18 and 20 may be fixedly attached to the ends of the casing or alternately may be integrally formed as a secure, permanent part thereof. In any event, a fluid tight seal is established between the junction of the cap 18 and the cylinder 12 as at 21. Similar sealing structure may be provided as at 23 with regard to the juncture between cap 20 and the casing 12.

Further structural features of the present invention comprise a viewing means or window 26 formed in a portion of the side wall of the casing 12. This viewing means or window 26 is substantially transparent, or at least translucent so as to properly view indicator means generally indicated in FIG. 2 as 28 and as will be explained in greater detail hereinafter.

Indicator means 28 comprises a hollow elongated, closed tubular element 32 specifically dimensioned and configured to be mounted on the interior of the casing 12 in the area generally defined as the fluid chamber 33. Additional structural features of the indicator cylinder or tubing 32 comprise a spacer means 34 and 36. In this particular embodiment spacer means 34 and 36 are located at opposite ends of the indicator tube or cylinder 32 and are structured in the form of outwardly extending flanges which protrude outwardly from the outer surface of the indicator tube 32. In this orientation the spacer flanges 34 serve to engage the interior surface 35 of the casing 12. Similar action occurs at the opposite end with regard to the interaction between the interior surface 35 and the spacer flange 36. This spacer flange orientation on opposite ends of the indicator tube prevents the exterior surface of the indicator tube 32 from coming into frictional or "sticking" adhesive engagement with the interior surface of the casing 12. If such adherence did occur, it would be difficult or impossible to accurately allow the indicator tube to be maintained in floating relation on the fluid 39 so as to indicate the level thereof. Fluid 39, is maintained in the container along with a foundation or supporting soil 50. An inlet means in the form of aperture 42 is formed in cap end 18 and disposed in fluid communicating relation with the interior of the container and fluid 39 therein (FIG. 1). Similarly, a vent means 45 in the form of an integrally formed aperture exits from the fluid chamber 33 as the liquid 39 enters therein and the liquid level 46 rises.

Another structural feature of the present invention is the provision of the indicia means generally indicated as 47 and, in the preferred embodiment of the present invention, defined by an indicator strip 49 disposed on the interior of the indicator tube 32. The indicator tube is formed from a transparent or translucent material along at least a portion of its length so as to allow viewing of the indicator strip 49 therethrough along at least a portion of its length. This particular area is thereby viewable through window 26. Accordingly, when the entire gauge assembly is positioned as depicted in FIG. 1, the liquid 39 flows from the container into the interior or fluid chamber 33 of the casing 12. This in turn causes the indicator tube 32 to float or rise up within the fluid chamber 33 such that the indicator strip 49 and/or other adequate or applicable indicia means 47 is viewable through window 26. Therefore, dependent upon the particular indicia which is exposed through the window 26 the viewer can readily determine the level of the liquid 39 within the fluid chamber 33 of casing 12 and accordingly therefore the level of the liquid 39 within the container relative to the foundation soil 50 and the root system of the plant being supported by the foundation soil 50 and/or the liquid 39.

Further structural features of the present invention comprise the provision of an anchoring means generally indicated as 52 and includes an elongated rod element 53 mounted at some point in casing 12 in substantially transverse relation to the longitudinal axis of the casing 12. In this position it is disposed (FIG. 1) to prohibit or make very difficult inadvertent removal of the gauge means from the liquid and particularly the foundation soil 50 since it is disposed in a transverse, interruptive path relative to the direction of removal of the gauge casing as generally indicated by directional arrow 54. In one embodiment of the present invention the anchor rod 53 is removably attached as through apertures 55 in casing 12 so as to facilitate storage and/or packing. In such an embodiment the junction of the anchor rod 53 with the aperture surface 55 must be such as to prevent leakage therefrom.

It will thus be seen that the objects made apparent from the preceding description, are efficiently attained, and since certain changes may be made in carrying out the above method and article without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention, which, as a matter of language, might be said to fall therebetween.

Now that the invention has been described,
What is claimed is:

1. A liquid gauge means of the type primarily designed to determine liquid levels in plant containers having liquid and supporting soil material maintained therein, said liquid gauge comprising: a casing including a substantially elongated configuration and a hollow interior, vent means formed in said casing, inlet means formed in said casing in spaced relation to said vent means, both said vent means and said inlet means each comprising at least one aperture disposed in interconnecting relation between the interior and exterior of said casing, whereby air escapes from said vent means as liquid enters said inlet means; indicator means movably mounted on the interior of said casing and comprising a substantially elongated configuration having a longitudinal dimension less than that of said casing, said indicator means structured to be floatable within said casing, whereby the level of liquid within said container is indicated by the relative disposition of said indicator means to predetermined portions of said casing; anchor means connected to said casing and extending outwardly therefrom in substantially transverse relation to the longitudinal axis of said casing and into supported engagement with the supporting soil material, whereby said casing is maintained in substantially upright position due to engagement between the supporting soil material and said anchor means.

2. A liquid gauge means as in claim 1 wherein said anchor means comprises a substantially elongated rod extending outwardly from both sides of said casing, said elongated rod removably connected to said casing.

3. A liquid gauge means as in claim 1 further comprising spacer means connected to said indicator element and extending outwardly from the surface of said indicator means into engageable relation to the interior surface of said casing.

4. A liquid gauge means as in claim 3 wherein said spacer means comprises at least two flange elements each having a substantially annular configuration and disposed in spaced relation to one another and substantially adjacent opposite ends of said indicator means, the remaining outer surface portion of said indicator means disposed out of engagement with the interior surface of said casing.

5. A liquid gauge means as in claim 1 wherein said indicator means comprises a tubular element including a substantially hollow, closed structure having its interior disposed in fluid tight relation to fluid within said casing, indicator means engaging said tubular element and disposed in viewable relation to the exterior of the tubular element.

6. A liquid gauge means as in claim 6 further comprising viewing means formed in said casing and disposed in viewable relation to said indicator means; said indicia means comprising an elongated strip including markings thereon and positioned on the interior of said tubular element in sealed relation to the exterior of said tubular element, whereby said tubular element is floatable within said casing.

7. A liquid gauge means as in claim 6 wherein said viewing means comprises a window element formed within said casing and disposed in aligned viewing relation with predetermined portions of said indicator means.

* * * * *

UNITED STATES PATENT AND TRADEMARK OFFICE
CERTIFICATE OF CORRECTION

PATENT NO. : 4,055,991
DATED : November 1, 1977
INVENTOR(S) : Willie Earl Bridwell It is certified that error appears in the above-identified patent and that said Letters Patent are hereby corrected as shown below:

Column 6, line 51, delete "6" and insert therefor --5--.

Signed and Sealed this

Thirtieth Day of October 1979

[SEAL]

Attest:

RUTH C. MASON
Attesting Officer

LUTRELLE F. PARKER
Acting Commissioner of Patents and Trademarks